US010902294B2

(12) United States Patent
Singh et al.

(10) Patent No.: US 10,902,294 B2
(45) Date of Patent: Jan. 26, 2021

(54) COMPUTER VISION SYSTEMS AND METHODS FOR MACHINE LEARNING USING IMAGE HALLUCINATIONS

(71) Applicant: Insurance Services Office, Inc., Jersey City, NY (US)

(72) Inventors: Maneesh Kumar Singh, Lawrenceville, NJ (US); Hani Altwaijry, Sunnvale, CA (US)

(73) Assignee: Insurance Services Office, Inc., Jersey City, NJ (US)

( * ) Notice: Subject to any disclaimer, the term of this patent is extended or adjusted under 35 U.S.C. 154(b) by 36 days.

(21) Appl. No.: 16/255,492

(22) Filed: Jan. 23, 2019

(65) Prior Publication Data

US 2019/0228267 A1 Jul. 25, 2019

Related U.S. Application Data (60) Provisional application No. 62/620,705, filed on Jan. 23, 2018.

(51) Int. Cl.
*G06K 9/00* (2006.01)
*G06K 9/62* (2006.01)
*G06N 3/04* (2006.01)
*G06N 3/08* (2006.01)

(52) U.S. Cl.
CPC ......... *G06K 9/6262* (2013.01); *G06K 9/6256* (2013.01); *G06N 3/04* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 8,488,913 B2 | 7/2013 | Lin et al. | |
| 8,737,737 B1 | 5/2014 | Feldman et al. | |
| 2005/0220355 A1 | 10/2005 | Sun et al. | |
| 2016/0027148 A1 | 1/2016 | Choudhury | |
| 2017/0124711 A1 | 5/2017 | Chandraker et al. | |
| 2017/0243084 A1* | 8/2017 | Soatto | G06K 9/6267 |
| 2019/0228267 A1* | 7/2019 | Singh | G06K 9/6262 |

OTHER PUBLICATIONS

International Search Report of the International Searching Authority dated Apr. 10, 2019, issued in connection with International Application No. PCT/US19/014783 (3 pages).

(Continued)

*Primary Examiner* — Hadi Akhavannik
(74) *Attorney, Agent, or Firm* — McCarter & English, LLP (57) ABSTRACT

Computer vision systems and methods for machine learning using image hallucinations are provided. The system generates image hallucinations that are subsequently used to train a deep neural network to match image patches. In this scenario, the synthesized changes serve in the learning of feature-embedding that captures how a patch of an image might look like from a different vantage point. In addition, a curricular learning framework is provided which is used to automatically train the neural network to progressively learn more invariant representations.

18 Claims, 13 Drawing Sheets

(56) References Cited

OTHER PUBLICATIONS

Written Opinion of the International Searching Authority dated Apr. 10, 2019, issued in connection with International Application No. PCT/US19/014783 (4 pages).
Babenko, et al., "Task Specific Local Region Matching," in ICCV, 2007 (8 pages).
Ba, et al., "Multiple Object Recognition with Visual Attention," in ICLR, arXiv:1412.7755v2, Apr. 23, 2015 (10 pages).
Altwaijry, et al., "Learning to Detect and Match Keypoints with Deep Architectures," in BMVC, 2016 (12 pages).
Altwaijry, et al., "Learning to Match Aerial Images with Deep Attentive Architectures," in CVPR, 2016 (9 pages).
Verdie, et al., "TILDE: A Temporally Invariant Learned Detector," In CVPR, arXiv:1411.4568v3, Mar. 12, 2015 (10 pages).
Taigman, et al., "Deepface: Closing the Gap to Human-Level Performance in Face Verification," in CVPR, 2014 (8 pages).
Simonyan, et al., "Learning Local Feature Descriptors using Convex Optimisation," IEEE Transactions on Patter Analysis and Machine Intelligfence, 2014 (14 pages).
Simo-Serra, et al., "Discriminative Learning of Deep Convolutional Feature Point Descriptors," in ICCV, 2015 (9 pages).
Quattoni, et al., "Recognizing Indoor Scenes," in CVPR, 2009 (8 pages).
Mnih, et al., "Recurrent Models of Visual Attention," in NIPS, 2014 (9 pages).
Long, et al., "Learning Image Matching by Simply Watching Video," CoRR, arXiv:1603.06041v2, Mar. 29, 2016 (21 pages).
Leutenegger, et al., "Brisk: Binary Robust Invariant Scalable Keypoints," in ICCV, 2011 (8 pages).
Jaderberg, et al., "Spatial Transformer Networks," in NIPS, 2015 (9 pages).
Hartmann, et al., "Predicting Matchability," in CVPR, 2014 (8 pages).
Han, et al., "MatchNet: Unifying Feature and Metric Learning for Patch-Based Matching," in CVPR, 2015 (8 pages).
Fischler, et al., "Random Sample Consensus: A Paradigm for Model Fitting with Applications to Image Analysis and Automated Cartography," Communications of ACM, Jun. 1981, vol. 24, No. 6 (16 pages).
DeTone, et al., "Deep Image Nomography Estimation," CoRR, arXiv:1606.03798v1, Jun. 13, 2016 (6 pages).
Lowe, "Object Recognition from Local Scale-Invariant Features," Proc. of the International Conference on Computer Vision, Corfu (Sep. 1999) (8 pages).
Everingham, et al., "The Pascal Visual Object Classes (VOC) Challenge," Int J Comput Vis (2010) vol. 88 (36 pages).
Zamir, et al. "Generic 3D Representations Via Pose Estimation and Matching," in ECCV, arXiv:1710.08247v1, Oct. 23, 2017 (18 pages).
Zagoruyko, et al., "Learning to Compare Image Patches Via Convolutional Neural Networks," CVPR, arXiv:1504.03641v1, Apr. 14, 2015 (9 pages).
Yu, et al., "ASIFT: An Algorithm for Fully Affine Invariant Comparison," Image Processing On Line 2011 (28 pages).
Moo, et al., "LIFT: Learned Invariant Feature Transform," in ECCV, arXiv:1603.09114v2, Jul. 29, 2016 (16 pages).
Xu, et al., "Show, Attend and Tell: Neural Image Caption Generation with Visual Attention," in ICML, arXiv:1502.03044v3, Apr. 19, 2016 (22 pages).
Wu, et al., "Multicore Bundle Adjustment," in CVPR, 2011 (8 pages).
Wu, "Towards Linear-Time Incremental Structure from Motion," in 3DV, 2013 (8 pages).
"Local features: State of the Art, Open Problems and Performance Evaluation," ECCV 2016 Workshop, 2016 (1 page).
Lee, et al. "Unsupervised Representation Learning by Sorting Sequences," arXiv.1708.01246, Aug. 3, 2017 (10 pages).
Girschick, "Fast R-CNN," in ICCV, arXiv:1504.08083v2, Sep. 27, 2015 (9 pages).
Fernando, et al., "Self-Supervised Video Representation Learning with Odd-One-Out Networks," in CVPR, arXiv:1611.06646v4, Apr. 5, 2017 (10 pages).
Everingham, et al., "The Pascal Visual Object Classes (VOC) Challenge," Int. J. Comput Vis, (2010) 88, pp. 303-338 (36 pages).
Doersch, et al., "Unsupervised Visual Representation Learning by Context Prediction," in ICCV, arXiv:1505.05192v3, Jan. 16, 2016 (10 pages).
Doersch, et al., "Mid-Level Visual Element Discovery as Discriminative Mode Seeking," in NIPS, 2013 (11 pages).
Deng, et al., "ImageNet: A Large-Scale Hierarchical Image Database," in CVPR, 2009 (8 pages).
Bengio, et al., "Greedy Layer-Wise Training of Deep Networks," in NIPS, 2007 (8 pages).
Agrawal, et al., "Learning to See by Moving, " in ICCV, arXiv:1505.01596v2, Sep. 14, 2015 (12 pages).
Abu-El-Haija, et al., "YouTube-8m: A Large-Scale Video Classification Benchmark, " arXiv:1609.08675v1, Sep. 27, 2016 (10 pages).
Long, et al., "Learning Image Matching by Simply Watching Video," in ECCV, arXiv:1603.06041v2, Mar. 29, 2016 (21 pages).
Larsson, et al., "Learning Representations for Automatic Colorization," in ECCV, arXiv:1603.06668v3, Aug. 13, 2017 (29 pages).
Kuehne, et al., HMDB: A Large Video Database for Human Motion Recognition, in IEEE International Conference on Computer Vision, 2011 (8 pages).
Krizhevsky, et al., "ImageNet Classification with Deep Convolutional Neural Networks," in NIPS, 2012 (9 pages).
Krahenbuhl, et al., "Data-Dependent Initializations of Convolutional Neural Networks," in ICLR, 2016 (12 pages).
Jia, et al., "Caffe: Convolutional Architecture for Fast Feature Embedding," in ACM MM, arXiv:1408.5093v1, Jun. 20, 2014 (4 pages).
Jayaraman, et al., "Slow and Steady Feature Analysis: Higher Order Temporal Coherence in Video," in CVPR, arXiv:1506.04714v2, Apr. 14, 2016 (16 pages).
Jayaraman, et al., "Learning Image Representations Tied to Ego-Motion," in ICCV, arXiv:1505.02206v2, Mar. 29, 2016 (14 pages).
Isola, et al., "Learning Visual Groups from Co-Occurrences in Space and Time," in ICLR, Workshop, 2016 (11 pages).
Ioffe, et al., "Batch Normalization: Accelerating Deep Network Training by Reducing Internal Covariate Shift," in ICML, arXiv:1502.03167v3, Mar. 2, 2015 (11 pages).
Hinton,et al., "Reducing the Dimensionality of Data with Neural Networks," Science, vol. 313, Jul. 28, 2006 (5 pages).
Raina, et al., "Self-Taught Learning: Transfer Learning from Unlabeled Data," in ICML, 2007 (8 pages).
Purushwalkam, et al., "Pose from Action: Unsupervised Learning of Pose Features Based on Motion," in ECCV, Workshop, arXiv:1609.05420v1, Sep. 18, 2016 (17 pages).
Pathak, et al., "Context Encoders: Feature Learning by Inpainting," in CVPR, arXiv:1604.07379v2, Nov. 21, 2016 (12 pages).
Owens, et al., "Ambient Sound Provides Supervision for Visual Learning," in ECCV, arXiv:1608.07017v2, Dec. 5, 2016 (20 pages).
Olshausen, et al., "Sparse Coding with an Overcomplete Basis Set: A Strategy Employed by V1?," Vision Research, vol. 37, No. 23, pp. 3311-3325, 1997 (15 pages).
Noroozi, et al., "Unsupervised Learning of Visual Representations by Solving Jigsaw Puzzles," in ECCV, arXiv:1603.09246v3, Aug. 22, 2017 (19 pages).
Mobahi, et al., "Deep Learning from Temporal Coherence in Video," in ICML, 2009 (8 pages).
Misra, et al., "Shuffle and Learn: Unsupervised Learning Using Temporal Order Verification," in ECCV, arXiv:1603.08561v2, Jul. 26, 2016 (21 pages).
Lotter, et al., "Deep Predictive Coding Networks for Video Prediction and Unsupervised Learning," in ICLR, arXiv:1605.08104v5, Mar. 1, 2017 (18 pages).
Le, et al., "Building High-Level Features Using Large Scale Unsupervised Learning," in ICML, 2012 (8 pages).
Zhang, et al., "Split-Brain Autoencoders: Unsupervised Learning by Cross-Channel Prediction," in CVPR, arXiv:1611.09842v3, Apr. 20, 2017 (11 pages).

(56) References Cited

OTHER PUBLICATIONS

Zhang, et al., "Colorful Image Colorization," in ECCV, arXiv:1603.08511v5, Oct. 5, 2016 (29 pages).
Wang, et al., "Unsupervised Learning of Visual Representations Using Videos," in CVPR, arXiv:1505.00687v2, Oct. 6, 2015 (9 pages).
Vondrick, et al., "Generating Videos with Scene Dynamics," 29th Conference on Neural Informationa Processing Systems (NIPS 2016), arXiv:1609.02612v3, Oct. 26, 2016 (10 pages).
Sun, et al., "Learning Discriminative Part Detectors for Image Classification and Cosegmentation," in ICCV, 2013 (8 pages).
Srivastava, et al., "Unsupervised Learning of Video Representations Using LSTMs," in ICML, arXiv:1502.04681v3, Jan. 4, 2016 (12 pages).
Soomro, et al., "UCF101: A Dataset of 101 Human Actions Classes from Videos in the Wild," arXiv:1212.0402v1, Dec. 3, 2012 (7 pages).
Sivic, et al., "Discovering Objects and Their Location in Images," in ICCV, 2005 (8 pages).
Singh, et al., "Unsupervised Discovery of Mid-Level Discriminative Patches," in ECCV, arXiv:1205.3137v2, Aug. 18, 2012 (15 pages).
Simonyan, et al., "Very Deep Convolutional Networks for Large-Scale Image Recognition," in ICLR, arXiv:1409.1556v6, Apr. 10, 2015 (14 pages).
Russell, et al., "Using Multiple Segmentations to Discover Objects and Their Extent in Image Collections," Proceedings of the 2006 IEEE Computer Society Conference on Computer Vision and Pattern Recognition (CVPR, 2006) (8 pages).
Li, et al., "Unsupervised Visual Representation Learning by Graph-Based Consistent Constraints," in ECCV, 2016 (16 pages).
Dalal, et al., "Histograms of Oriented Gradients for Human Detection," in CVPR, 2005 (8 pages).
Collobert, et al., "Torch7: A Matlab-Like Environment for Machine Learning," in BigLearn, NIPS Workshop, 2011 (6 pages).
Calonder, et al., "BRIEF: Computing a Local Binary Descriptor Very Fast," IEEE Transactions on Pattern Analysis and Machine Intelligence, vol. 34, No. 7, Jul. 2012 (18 pages).
Brown, et al. "Discriminative Learning of Local Image Descriptors," PAMI, 2011 (14 pages).
Bromley, et al., "Signature Verification Using a "Siamese" Time Delay Neural Network," in NIPS, 1994 (8 pages).
Bay, et al., "SURF: Speeded Up Robust Features," in ECCV, 2006 (14 pages).
Balntas, et al., "Learning Local Feature Descriptors with Triplets and Shallow Convolutional Neural Networks," in BMVC, 2016 (11 pages).

\* cited by examiner

COMPUTER VISION SYSTEMS AND METHODS FOR MACHINE LEARNING USING IMAGE HALLUCINATIONS

CROSS-REFERENCE TO RELATED APPLICATIONS

This application claims the benefit of U.S. Provisional Patent Application No. 62/620,705 filed on Jan. 23, 2018, the entire disclosure of which is expressly incorporated herein by reference.

BACKGROUND

Technical Field

The present disclosure relates generally to computer vision and machine learning. More particularly, the present disclosure relates to computer vision systems and methods for machine learning using image hallucinations.

Related Art

In computer vision applications, two varying approaches have been historically adopted to solve vision problems, namely, feature-based and direct methods. The initial motive for feature-based approaches had been the reduction of computation requirements for vision algorithms. Research in feature-based approaches led to the development of many algorithms for two separate tasks. The first task is to detect salient regions within an image, for the purpose of only processing those salient regions while discarding the remainder of the pixels. The second task is to describe the contents of those salient regions. Computer vision algorithms proceed by performing these two tasks and using the computed features to accomplish more complex goals, such as finding correspondences between two images, or detecting a certain object within an image, for example.

Approaches to feature description have leveraged discriminative learning methods to learn descriptors superior to manually-engineered variants. These learning approaches often involve neural networks and deep learning. One of the main criticisms of neural-based approaches to patch description is the requirement of immensely large numbers of matching patches to learn proper descriptors that generalize well. The requirement for matching patches arises from the underlying models that aim to learn high-dimensional embedding spaces where matching patches are closer to each other as compared to non-matching patches. Existing methods have mainly relied on structure-from-motion to create sparse 3D models with many views of a single 3D point, thereby generating very large numbers of matching patches.

However, the current solutions are costly because they require a large number of carefully labelled patches to achieve good performance, and there is no method for training and learning for patch description. Therefore, there exists a need for computer vision systems and methods for machine learning using image hallucinations which addresses the foregoing needs.

SUMMARY

Computer vision systems and methods for machine learning using image hallucinations are provided. The system generates image hallucinations that are subsequently used to train a deep neural network to match image patches. In this scenario, the synthesized changes serve in the learning of feature-embedding that captures how a patch of an image might look like from a different vantage point. In addition, a curricular learning framework is provided which is used to automatically train the neural network to progressively learn more invariant representations.

BRIEF DESCRIPTION OF THE DRAWINGS

The foregoing features of the invention will be apparent from the following Detailed Description, taken in connection with the accompanying drawings, in which.

DETAILED DESCRIPTION

The present disclosure relates to a computer vision systems and methods for machine learning using image hallucinations, as discussed in detail below in connection with FIGS. 1-12. The system and method of the present disclosure can function without requiring large numbers of high-quality training data containing correspondences between different patches taken from different viewpoints. Accordingly, patches from ordinary images can be used to synthesize a whole training set. The synthesis approach generates views of the same patch from different random viewpoints with the use of homographies. The synthesis approach can be paired with a curricular learning framework that automatically guides the neural network through successive levels of difficulty to progressively learn better invariant representations, as will be explained in greater detail below.

Figure 1:
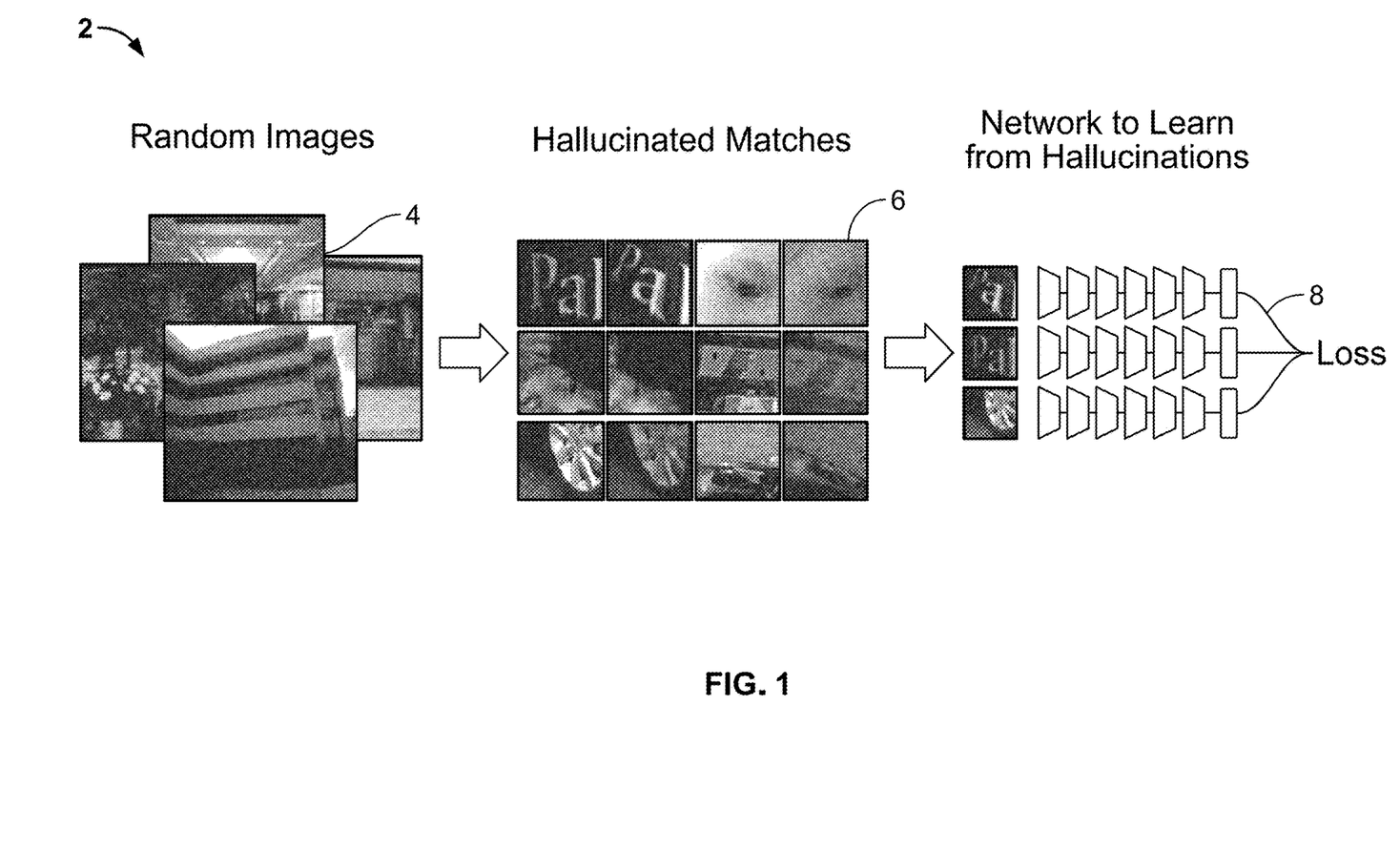
FIG. 1 is a diagram of a system in accordance with the present disclosure for learning patch descriptions from hallucinated images.

FIG. 1 is a diagram of a system 2 in accordance with the present disclosure for learning patch descriptions from hallucinated images. The system can begin by processing a plurality of random images 4. The system can process the plurality of random images 4 and generate a plurality of hallucinated matches 6. The system can then provide the plurality of hallucinated matches 6 to a deep learning neural network 8 to learn feature identification from the plurality of hallucinated matches 6.

Figure 2:
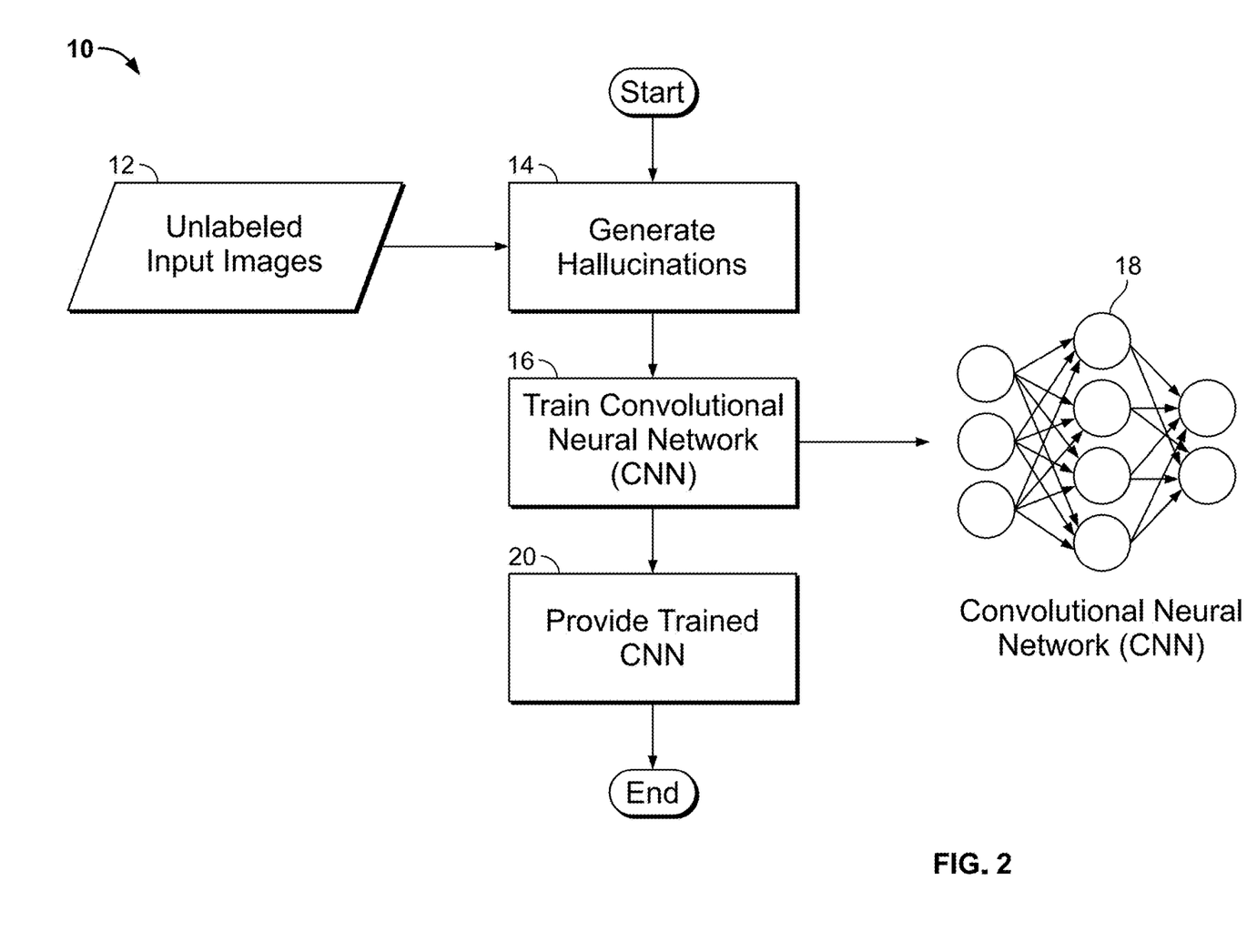
FIG. 2 is a flowchart illustrating processing steps in accordance with the present disclosure for training a neural network using hallucinated image patches.

FIG. 2 is a flowchart illustrating processing steps 10 carried out by the system for performing machine learning using hallucinated image patches. In step 12, unlabeled input images are accessed by the system. In step 14, hallucination image patches can be generated as will be explained in greater detail below. In step 16, the hallucinated image patches can be used to train a neural network 18, such as a convolutional neural network. In step 20, once trained, the neural network can be provided for future computer vision tasks, such as feature recognition (e.g., identifying one or more desired features in images).

Figure 3:
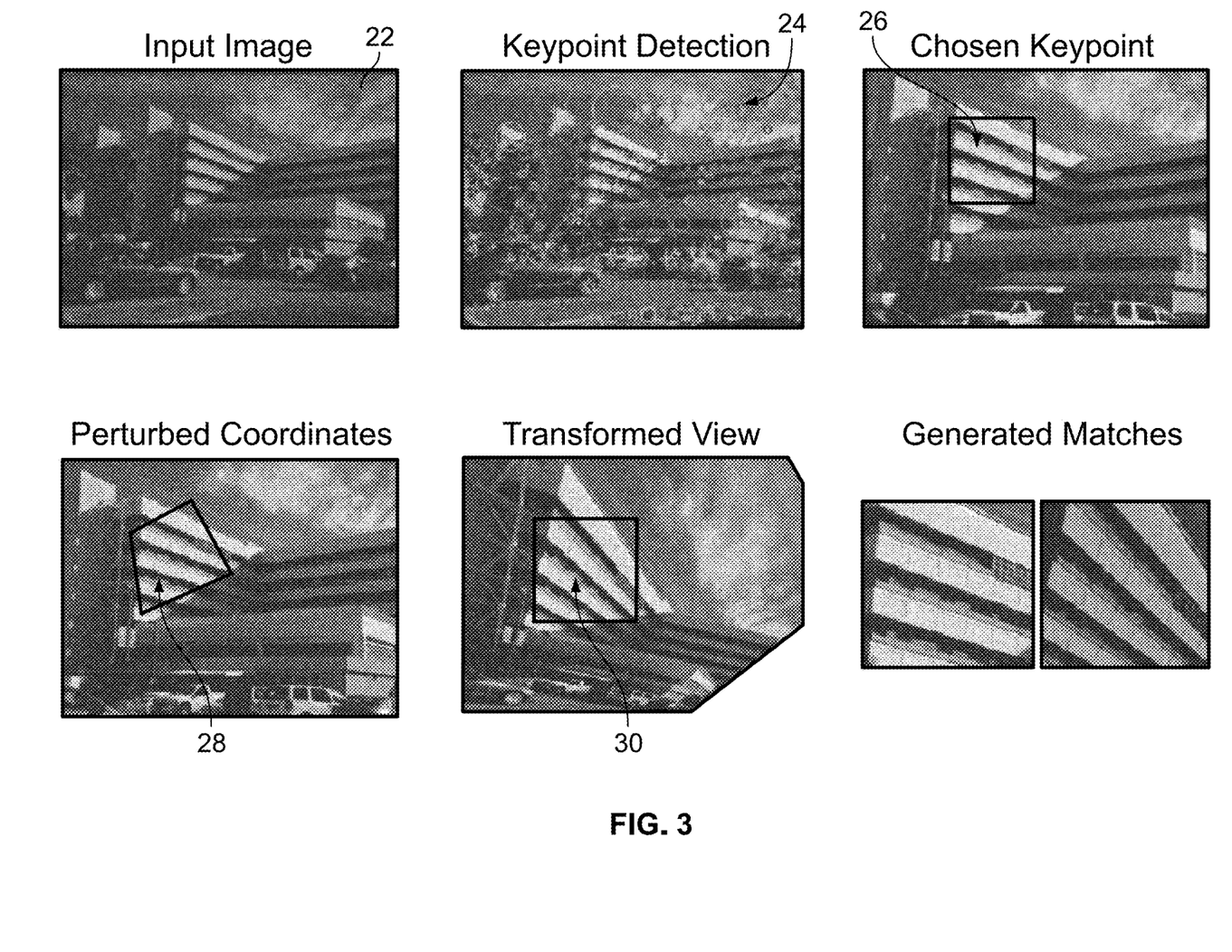
FIG. 3 illustrates processes in accordance with the present disclosure for the generation of matching hallucinated patches.

FIG. 3 illustrates a process in accordance with the present disclosure for the generation of matching hallucinated patches. A good patch for viewpoint change synthesis can be identified by treating the contents of the patch as if they were from a planar scene. As shown in FIG. 3, given an input image 22 (also herein defined as variable I), a feature detector can be executed by a processor to identify a set of keypoints (identified by reference numeral 24) $K=\{k_i k_i=(x_i, y_i), x_i \in [0,W) y_i \in [0,H)\}$, where W and H are the width and height of I, respectively. Afterwards, a keypoint (identified by reference numeral 26) $k \in K$ can be randomly selected, and then the system can determine a patch P of size S×S with k defining its center.) The variable P can be defined as a tuple: $P=(p_{tl}, p_{tr}, p_{bl}, p_{br})$ of the four corners of the patch, where $p_* = (x, y)$ are pixel-coordinates. Given a maximum perturbation value $V_{pix}$, the system can randomly perturb the locations of each corner $o_* = (p_* + \varepsilon)$, where $\varepsilon \neq \text{Uniform}(-V_{pix}, V_{pix})^2$. These perturbations can allow viewing the patch from a different viewpoint. Moreover, given $V_{rot}$, the system can simulate rotations by randomly picking a rotation angle $\theta \neq \text{Uniform}(-V_{rot}, V_{rot})$. The rotation angle $\theta$ can be used to define a rotation matrix $R \in SO(2)$. The system can then arrive at the final perturbed pixel locations (element 28) $q_* = Ro_*$.

Given the final perturbed location $Q=(q_{tl}, q_{tr}, q_{bl}, q_{br})$, the system can solve the homography $H^{QP}$ relating the two point sets P, Q using the direct linear transformation (DLT) algorithm. The system can then use $H^{QP}$ to transform I to create a transformed patch 30. The system can then crop the patches 28 and 30 defined by P from both I and its transformed version. The resulting two patches can be considered matches. The system can then further process the match by simulating illumination changes through random brightness and contrast shifts. Finally, the system can simulate zoom effects by randomly blurring one of the patches with a Gaussian filter of random size and standard deviation, both selected from $V_{blur-k}=\{3,5,7,9\}$ and $V_{blur-\sigma}=\{1.5,2,2.5,3,3.5\}$.

Figure 4:
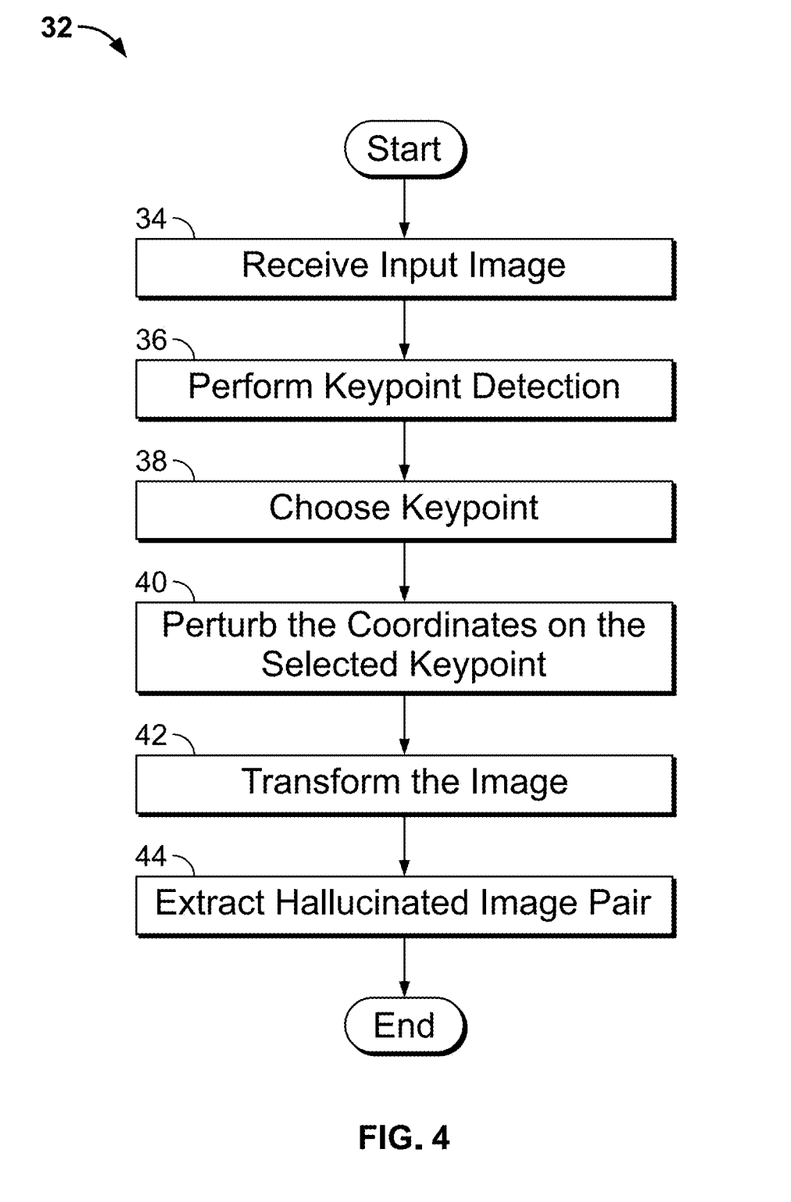
FIG. 4 is a flowchart illustrating processing steps in accordance with the present disclosure for creating a matching hallucinated image pair.

FIG. 4 is a flowchart illustrating processing steps for creating a matching hallucinated image pair as described in connection with FIG. 3. In step 34, the system can receive an input image. In step 36, the system can perform keypoint detection on the image. Then, in step 38, the system can choose a keypoint from the plurality of keypoints detected on the image in step 36. In step 40, the system can perturb the coordinates on the selected keypoint in step 38. In step 42, the system can create a transformed view as described above. Finally, in step 44, the system can extract the two patches to create a hallucinated image pair of patches.

Given the method for generating synthesized patch matches, the system can build a neural model to learn a feature embedding for those synthesized matches. The architecture of the model can be designed around a triplet loss, with three feature extraction towers that share weights. Each tower can compute a feature descriptor given a color image. The loss function can then drive similar patches closer to each other in the embedding space.

The system can use a triplet loss function from to learn feature descriptor embedding. Given the hallucination method of the present disclosure, the system can define patch triplets $T=\{t_i:(a^i, p^i, n^i,)\}$, such that $(a^i, p^i)$ can be generated matching patches, and $n^i$ can be a randomly extracted patch. Further, given a scalar margin a, the loss function can be defined $L_T$ as:

$$\mathcal{L}_T = \frac{1}{N}\sum_i [\max(0, D(a^i, p^i) + \alpha - D(a^i, n^i))]$$

where $\alpha$ is chosen as 0:2 and D is a Euclidean distance function defined on the embedding feature vectors, which are computed from the image patches as shown in the equation below:

$$D(a,b)=\|f(a)-f(b)\|_2$$

To train the model, the system can allow the neural network to learn to match easy patches first before moving on to harder examples. In essence, the method can be similar to a school curriculum where easy subjects are introduced before more advanced topics, while only allowing students to advance after passing knowledge tests. During training, the performance of the neural network can be assessed on various difficulty settings, and an appropriate difficulty can be selected afterward. The difficulty settings can be defined by the values for synthesizing patch matches, $V_{pix}$ and $V_{rot}$.

Figure 5:
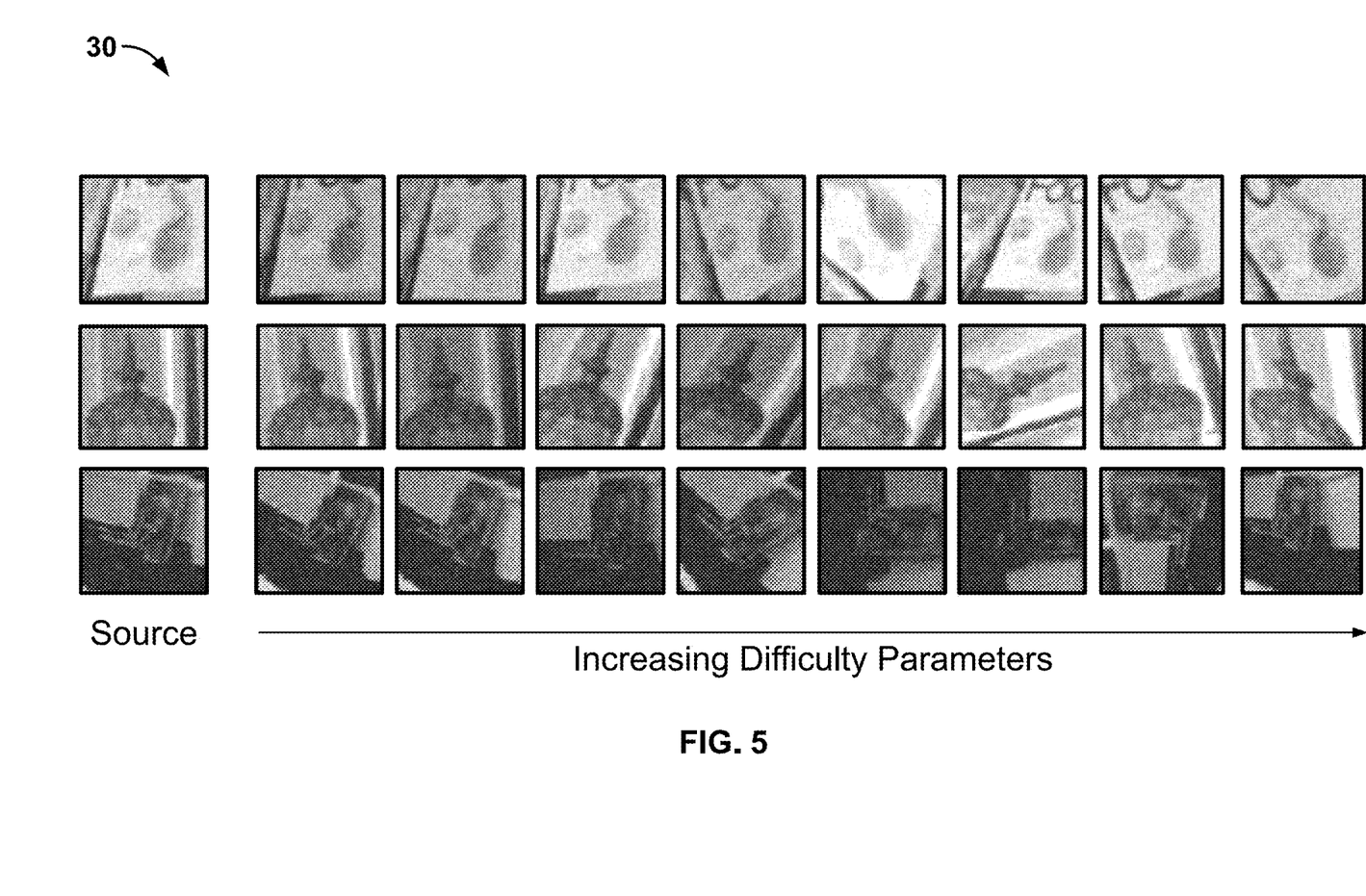
FIG. 5 illustrates examples of pairs of patches having increased difficulty.

Curricular training can compute the loss of the test examples without performing any back-propagation. This can ensure that the harder examples which exhibit large deformations do not destabilize the learning procedure and that the system progresses when performance of the easier examples is satisfactory. The difficulty can be automatically adjusted by either increasing or decreasing $V_{pix}$ and $V_{rot}$, thus allowing the neural network to fall back to easier examples if it starts making mistakes on harder examples. FIG. 5 is an example of pairs of patches with increased difficulty.

Hard-negative mining for training the neural network will now be explained in greater detail. During each training iteration, the system can load a batch of anchors and positives, and a pool of negatives. The pool of negatives can be used to choose the hardest example for each pair of anchors and positives. The hard examples can be determined through their loss values. The system can retry mining for a fixed number of times, and if no hard negatives are found, the system can proceed with the batch in hand.

Experiments and implementation of the systems of the methods of the present disclosure will now be explained in greater detail. A training set can be composed of images used to seed the hallucination procedure. Some variance in the image contents can be included to increase the robustness of a descriptor. Test images can be received from the PASCAL VOC 2007-2012 and aerial images used by any suitable aerial image database known in the art. The goal for mixing in aerial imagery is reflected in the affine nature of aerial images, such that they do not exhibit many 3D structure artifacts found in PASCAL VOC images.

During training, when loading a batch, the data can be generated on a real-time basis, for example, to reduce the effects of data-loading. All training images can be preprocessed by cropping patches of size 128×128 at random and storing them for live retrieval. When a training batch is requested, the system can execute the keypoint detector, discard all keypoint sizes, and randomly pick one. All training patches can be of size 64×64.

The network architecture for experimentation and training can be defined as follows: C(3/16/2)-BN-ReLU-C(3/32/2)-BN-ReLU-C(3/32/1)-BN-ReLU-C (3/64/1)-BN-ReLU-C (3/64/1)-BN-ReLU-C (3/128/1)-BN-ReLU-C (3/128/1)-FC (512)-BN-ReLU-FC(256)-BN-ReLU-FC(128)-$L_2$Normalize Here C(k/f/s) denotes Convolution with a kernel size of k, f filters, and a stride of s. Also, BN denotes Batch Normalization, ReLU is the rectilinear activation function, and FC(d) denotes a fully connected layer with d outputs.

The neural network can be implemented using the Torch7 machine learning library, and can use a stochastic gradient descent with an initial learning rate of 0.01, and 0.9 momentum.

Figure 6:
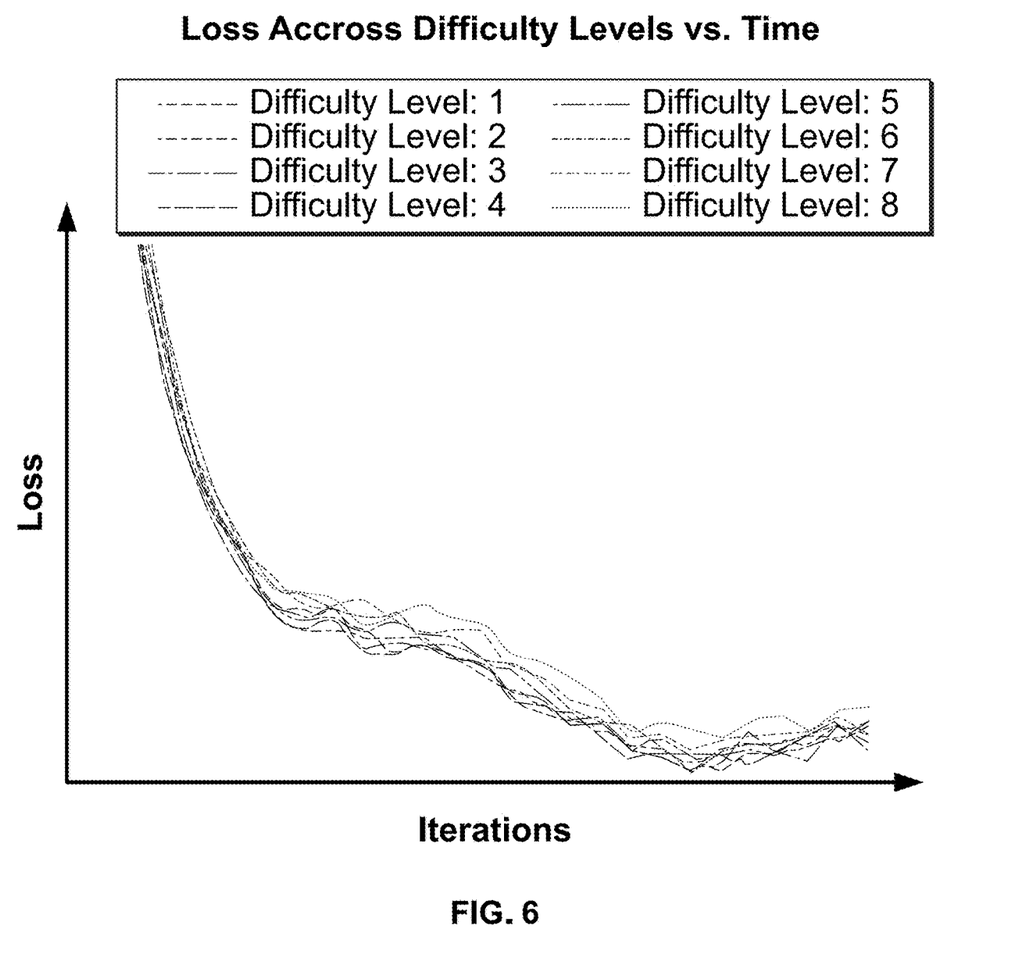
FIG. 6 is a graph showing loss values for pairs of patches at eight difficulty levels.

FIG. 6 is a graph showing loss values for pairs of patch at 8 difficulty levels, where higher numbers reflect higher difficulty. As can be seen, there can be an overall higher-loss for higher difficulty levels, however, easier examples do contribute to lowering the loss of more difficult examples. This can be attributed to how data is generated, as under higher difficulty settings, the data generation could yield an easy example due to the random process. Overall, visually difficult examples tend to have higher loss values.

Figure 7:
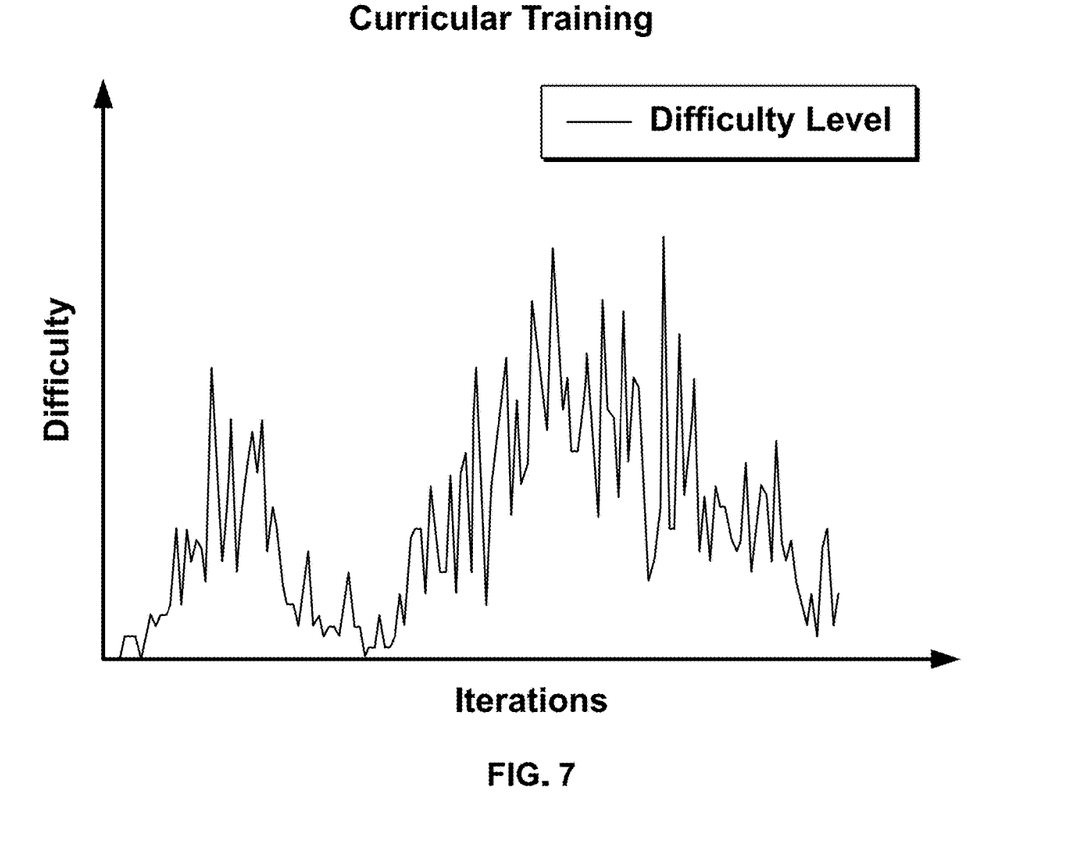
FIG. 7 is a graph showing automatic adjustment of difficulty levels during training of a neural network.

FIG. 7 shows automatic adjustment of difficulty levels during training of a neural network. The higher loss values of visually difficult can be addressed by the curricular training procedure updating difficulty. As can be seen in FIG. 7, difficulty can be steadily increased and decreased whenever the neural network starts performing poorly on simpler examples. FIG. 7 shows a cycle of oscillations between progressing to hard examples and falling back to simpler ones. This can be due to the nature of the hardness of both being able to handle small and very large viewpoint changes.

Figure 8:
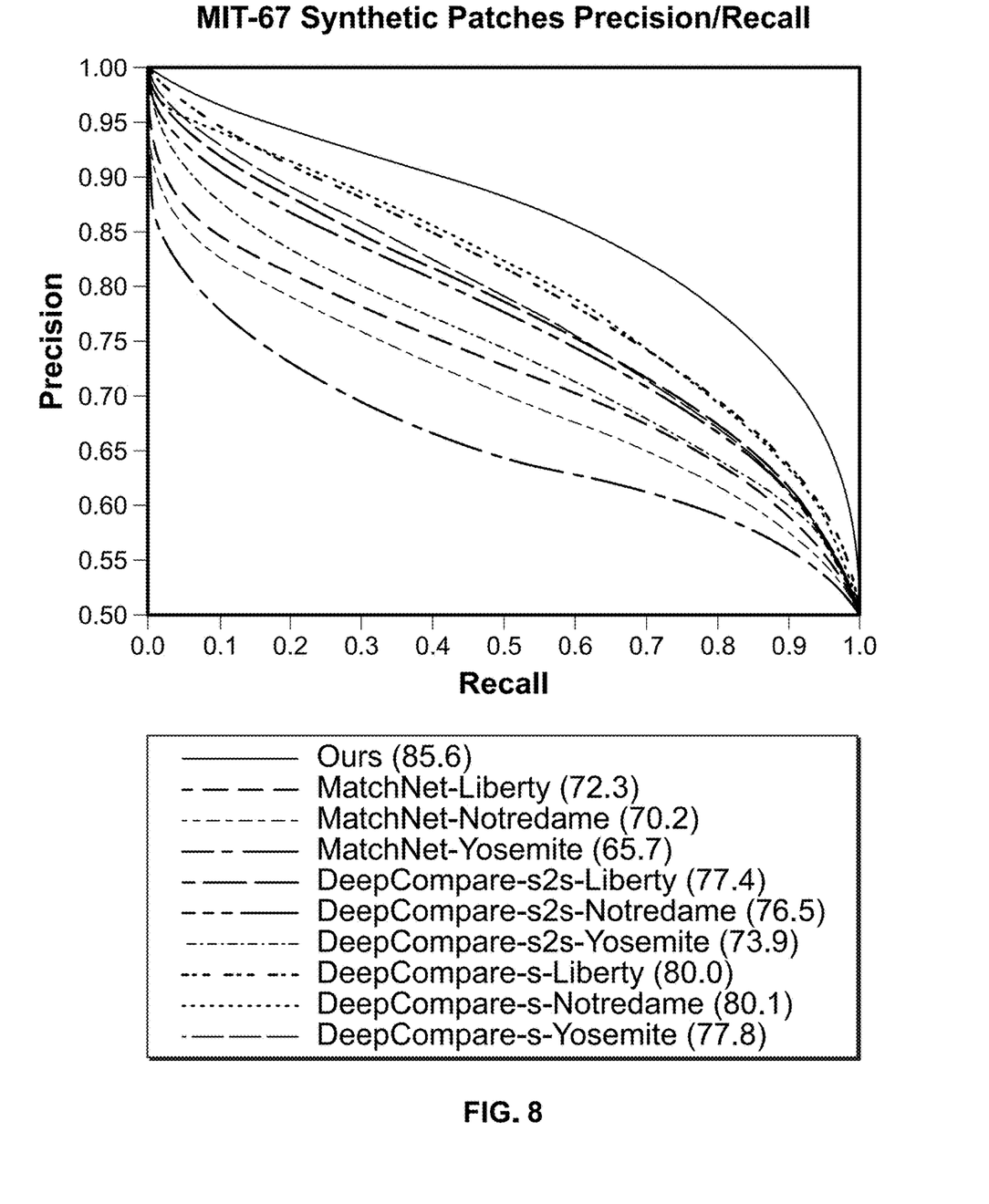
FIG. 8 is a graph showing precision/recall curves for a set of patches synthesized at various difficulty settings.

FIG. 8 is a graph showing precision/recall curves for a set of patches synthesized at various difficulty settings. This graph can be generated from an experiment to compare the descriptor with over-the-shelf learned descriptors on synthesized patch matches. The MIT-67 indoor scenes dataset can be used to sample synthetic matches from, such that the training and testing sources are completely disjoint. The experiment can be set up in a similar fashion to the sampling during training, except that a different dataset can be used as the sample. Using the hallucination method described in greater detail above, the system can generate pairs of matching patches. The next step can be to correctly identify the genuine matching pairs. As noted above, FIG. 8 shows the precision/recall curves for a set of patches synthesized at various difficulty settings. The method generalizes to this newly synthesized dataset without issues. The neural network could also have learned to match hallucinated patches.

Generalizing to real world data can be accomplished with the system of the present disclosure. The system can use an HPatches dataset to test the generalizability of the system of the present disclosure. Two experiments can be conducted in this regard. In the first experiment, 256 genuine matching pairs can be sampled with a pool of 255 negatives. The task is then to retrieve the genuine match out of the pool. Table 1 below gives the results of this experiment.

TABLE 1

Accuracy performance on HPatches.

| Method | Hit@1 | Hit@5 |
|---|---|---|
| MatchNet-Liberty [17] | .349 | .533 |
| MatchNet-Yosemite [17] | .191 | .348 |
| MatchNet-Notredame [17] | .354 | .59 |
| DeepCompare-s2s-Liberty [34] | .506 | .661 |
| DeepCompare-s2s-Yosemite [34] | .457 | .612 |
| DeepCompare-s2s-Notredame [34] | .475 | .629 |
| DeepCompare-s-Liberty [34] | .521 | .673 |
| DeepCompare-s-Yosemite [34] | .418 | .586 |
| DeepCompare-s-Notredame [34] | .462 | .619 |
| Ours | .520 | .653 |

Figure 9:
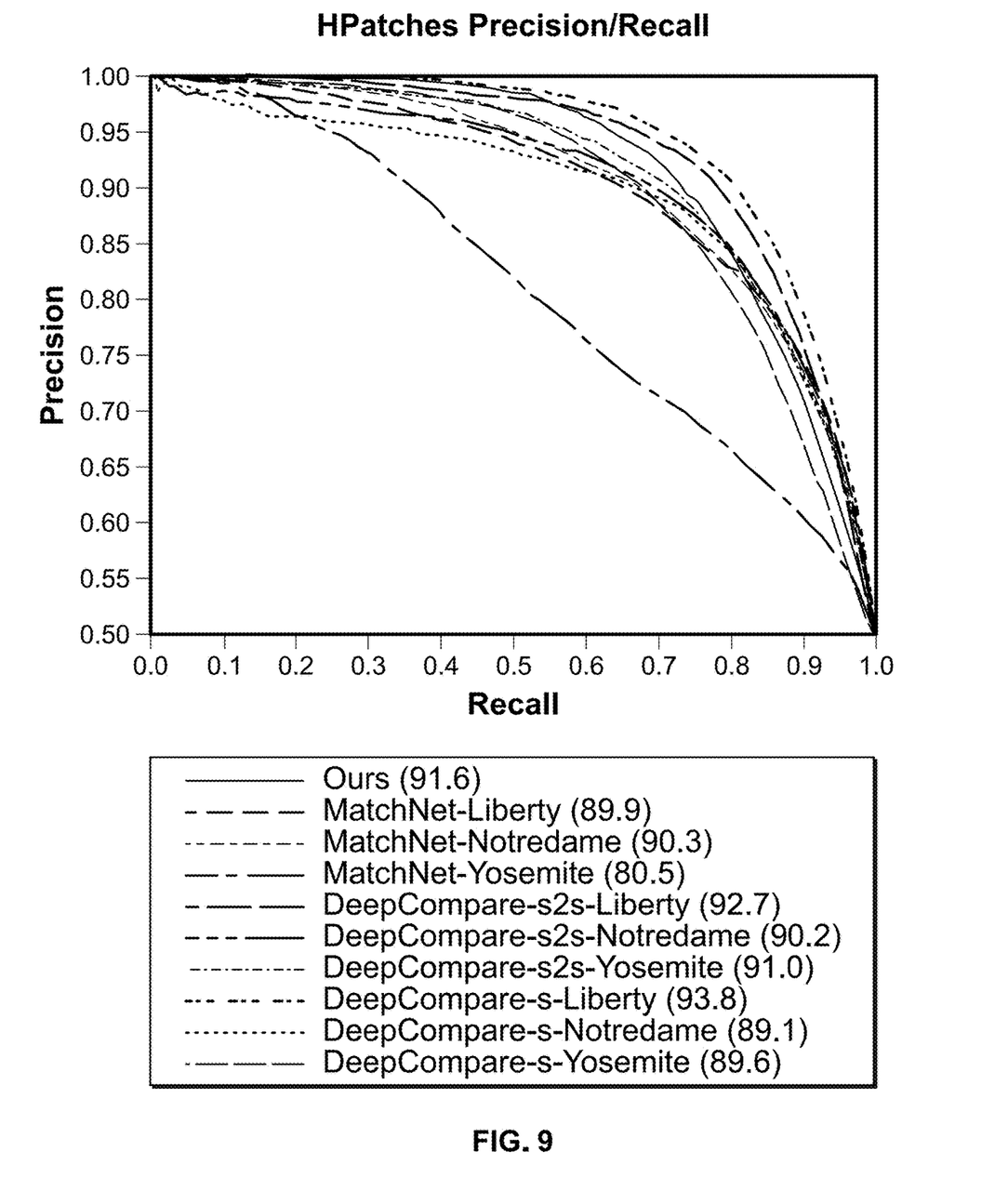
FIG. 9 is a graph showing precision/recall curves for a set of patches synthesized at various difficulty settings.

FIG. 9 is a second graph showing precision/recall curves for a set of patches synthesized at various difficulty settings. FIG. 9 relates to the second experiment relating to the HPatches dataset. In the HPatches dataset, the keypoint detector can also used to obtain a canonical orientation for the patch, and the provided patches can be cropped at the best orientation, for example, without having options for de-rotated versions. In the second experiment, the effectiveness of the neural network can be evaluated in a classification task. 25,000 pairs were evaluated in this experiment. The model of the present disclosure performed well and shows the value of synthesized training data to achieve good performance.

Figure 10A:
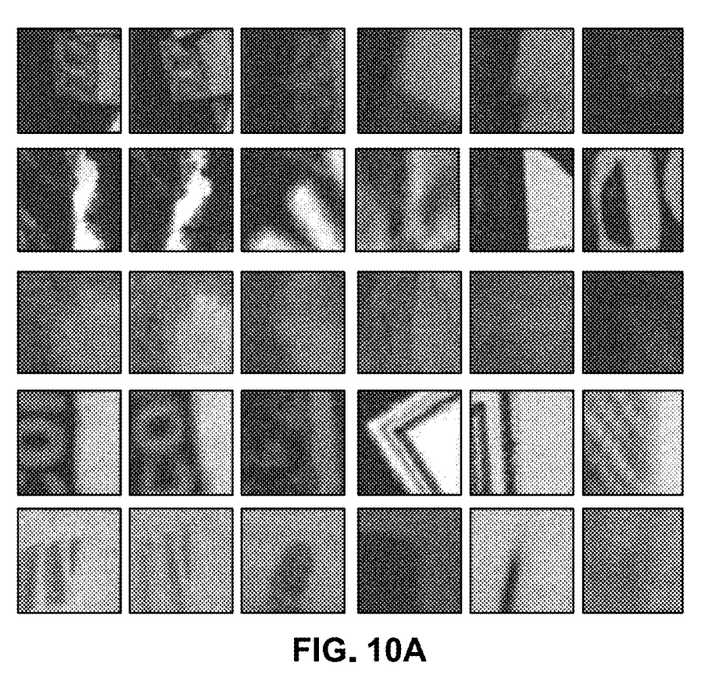
FIG. 10 illustrates examples of patches retrieved and matched from the HPatches dataset.
Figure 10B:
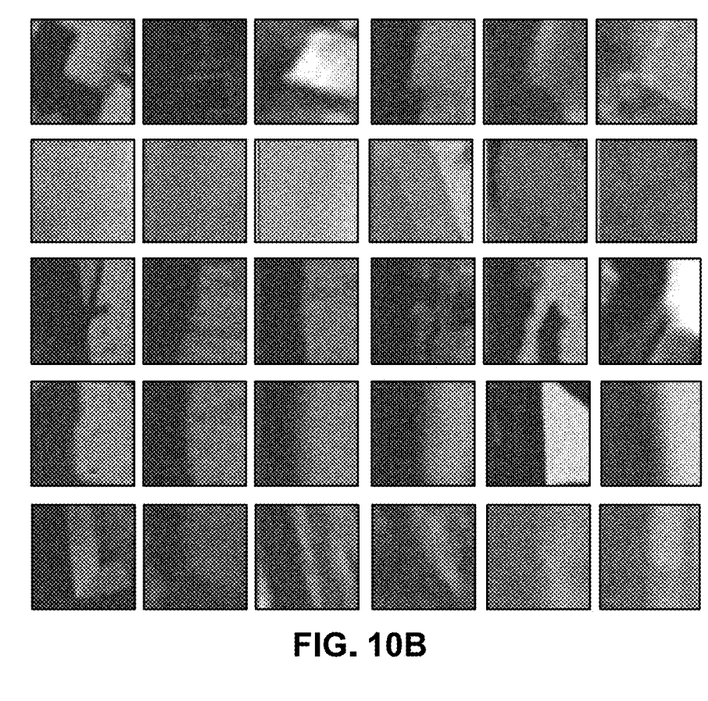

FIG. 10 is a drawing showing examples of patches retrieved and matched from the HPatches dataset. Portion (a) of FIG. 10 shows correctly matched patches in retrieval order (from left-to-right). The transformations exhibited between the matching pairs is not ver significant, but the quality of the image varies significantly, which is an artifact of the capture process. On the other hand, portion (b) of FIG. 10 shows patches which the neural network was unable to retrieve correctly. It is clear how visually similar the retrieved patches are, which explains the confusion of the network.

Figure 11:
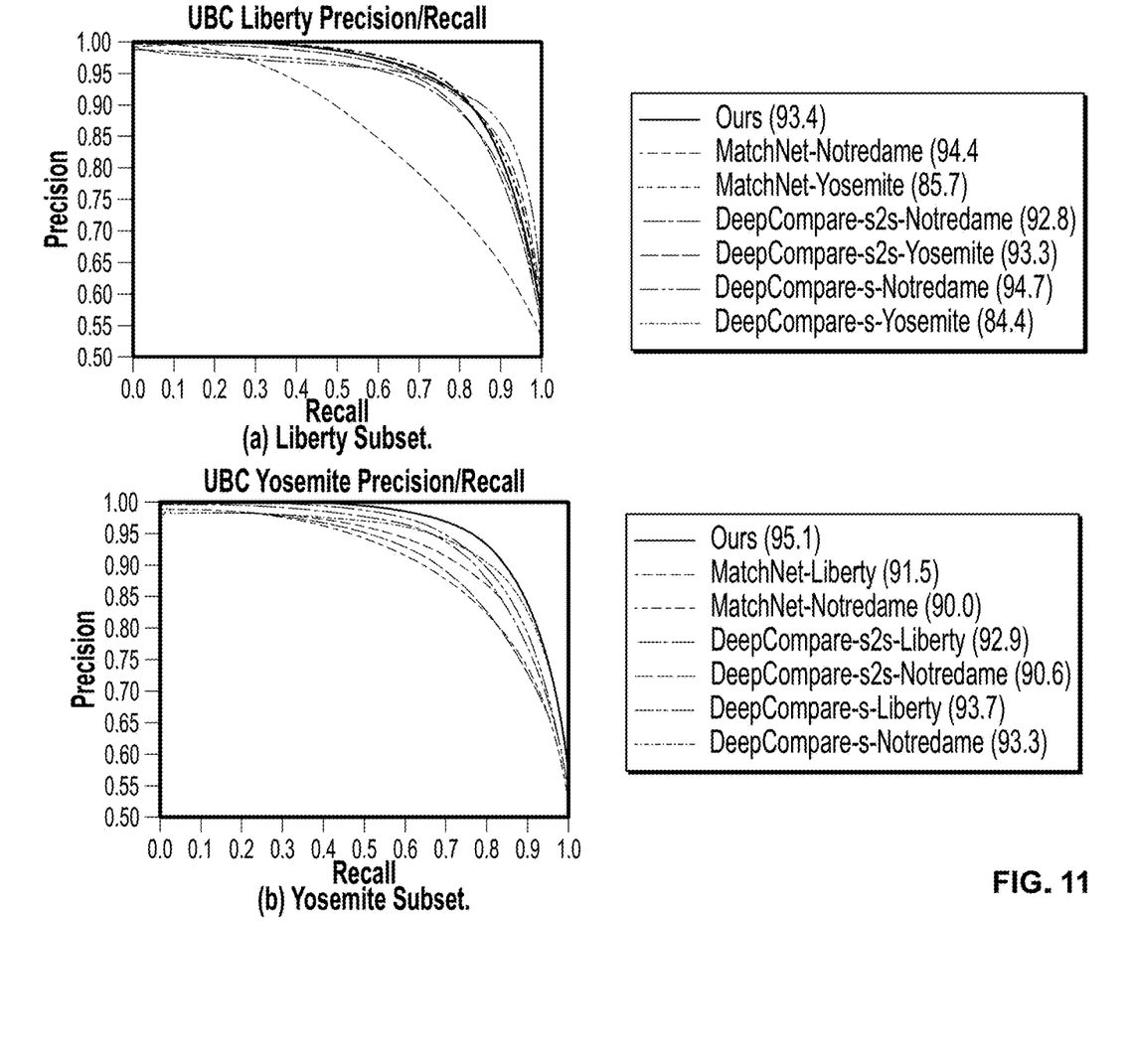
FIG. 11 are graphs showing precision/recall curves for an experiment run on the UBC Phototour dataset.

FIG. 11 shows precision/recall curves for an experiment run on the UBC Phototour dataset. The dataset includes three separate sets (Liberty, Yosemite, and Notredame) of matching patch pairs. The patch match classification experiment can be repeated three times, and the system can output precision-recall curve results on 25,000 pairs of patches obtained from each subset respectively. The results show that the system of the present disclosure performs well for synthesis methods, and shows that improving descriptors may lie in acquiring labels for instances that cannot be synthesized easily, such as those exhibiting 3D parallax.

The training and test sets used herein are from different datasets. The training set is generated from patches of the PASCAL VOC dataset (2007-2012) and aerial images were used using planar homographies. On the other hand, the test datasets HPatches and UBC Phototour can have a variety of transformations. The system of the present disclosure performs under these circumstances. This demonstrates the feasibility of using synthetic data to obtain invariant representations and can be scaled to datasets containing a larger class of transformations as shown by the results described above. Accordingly, the system of the present disclosure mitigates the need for high-quality real data with patch pairs exhibiting real 3D transformations between them, which can impose a debilitating burden of time and resources. Moreover, the system of the present disclosure shows the synergistic usage of hallucinations synthetic data with small amounts of high-quality real data embodied with patch pairs of 3D correspondences.

Figure 12:
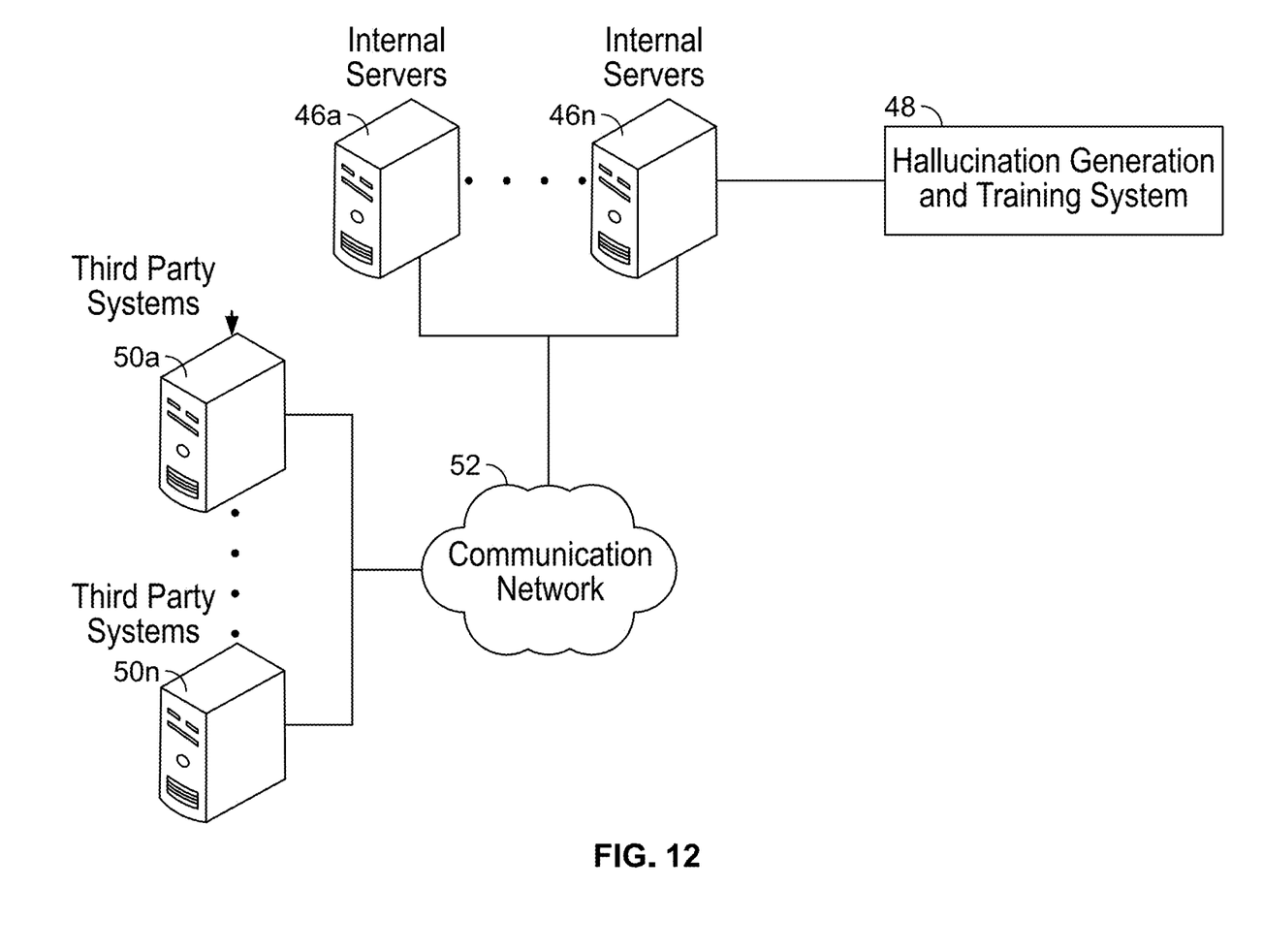
FIG. 12 is a diagram illustrating sample computer hardware components with which the system of the present disclosure could be implemented.

FIG. 12 is a diagram illustrating sample computer hardware with which the system of the present disclosure can be implemented. The system can include a plurality of internal computer systems/servers 46a-46n having a plurality of processors for executing computer instructions as described in the present disclosure. Such instructions could be embodied as one or more software modules 48, executed by one or more of the computer systems illustrated in FIG. 12. The system can also include a plurality of third-party computer systems/servers 50a-50n for storing a plurality of image data for generation of the hallucinated image pairs for training the neural network. The internal servers 46a-46n can communicate with the third-party systems 50a-50n over a network 52, such as the Internet. The present disclosure is not limited to storing the images on third party systems as those images can be stored on the internal servers 46a-46n or retrieved in any manner known to those of ordinary skill in the art.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure. What is intended to be protected by Letters Patent is set forth in the following claims.

The invention claimed is:

1. A method for machine learning using hallucinated image patches, comprising:
   receiving unlabeled input images at a computer system;
   generating one or more matched hallucinated image patches from the input images;
   training a convolutional neural network ("CNN") to learn features from the matched hallucinated image patches;
   receiving an input image;
   performing a keypoint detection on the input image to generate a plurality of detected keypoints;
   selecting a keypoint from a plurality of detected keypoints;
   perturbing coordinates on the selected keypoint;
   generating a transformed view of the selected keypoint; and
   extracting a first patch from the input image and a second patch from the transformed view to generate matched hallucinated image patches.

2. The method of claim 1, wherein the keypoint is selected randomly from the plurality of detected keypoints.

3. The method of claim 1, wherein step of perturbing coordinates on the selected keypoint comprises randomly perturbing locations of each corner of the selected keypoint.

4. The method of claim 3, wherein the step of perturbing coordinates on the selected keypoint further comprises rotating the coordinates by a rotation angle.

5. The method of claim 1, further comprising simulating brightness or contrast shifts in at least one of the first patch or the second patch.

6. The method of claim 1, further comprising simulating zoom effects in at least one of the first patch or the second patch.

7. The method of claim 6, wherein the step of simulating zoom effects comprises randomly blurring the first patch or the second patch with a Gaussian filter of a random size and a standard deviation.

8. The method of claim 1, wherein an architecture of the CNN is designed around a triple loss function.

9. The method of claim 1, wherein step of training the CNN comprises using hard-negative mining.

10. A system for machine learning using hallucinated image patches, comprising:
    a processor in communication with an image source; and
    computer system code executed by the processor, the computer system code causing the processor to:
       receive unlabeled input images from the image source;
       generate one or more matched hallucinated image patches from the input images;
       train a convolutional neural network ("CNN") to learn features from the matched hallucinated image patches;
       receive an input image;
       perform a keypoint detection on the input image to generate a plurality of detected keypoints;
       select a keypoint from a plurality of detected keypoints;
       perturb coordinates on the selected keypoint;
       generate a transformed view of the selected keypoint; and
       extract a first patch from the input image and a second patch from the transformed view to generate matched hallucinated image patches.

11. The system of claim 10, wherein the keypoint is selected randomly from the plurality of detected keypoints.

12. The system of claim 10, wherein step of perturbing coordinates on the selected keypoint comprises randomly perturbing locations of each corner of the selected keypoint.

13. The system of claim 12, wherein the step of perturbing coordinates on the selected keypoint further comprises rotating the coordinates by a rotation angle.

14. The system of claim 10, wherein the computer system code causes the processor to simulate brightness or contrast shifts in at least one of the first patch or the second patch.

15. The system of claim 10, the computer system code causes the processor to simulate zoom effects in at least one of the first patch or the second patch.

16. The system of claim 15, wherein the step of simulating zoom effects comprises randomly blurring the first patch or the second patch with a Gaussian filter of a random size and a standard deviation.

17. The system of claim 10, wherein an architecture of the CNN is designed around a triple loss function.

18. The system of claim 10, wherein step of training the CNN comprises using hard-negative mining.

\* \* \* \* \*